United States Patent
Masuda et al.

(10) Patent No.: US 11,110,612 B2
(45) Date of Patent: Sep. 7, 2021

(54) PROCESSING DEVICE, SYSTEM, AND CONTROL METHOD

(71) Applicant: SONY CORPORATION, Tokyo (JP)

(72) Inventors: Hiromasa Masuda, Tokyo (JP); Kenichiro Nagasaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 16/314,454

(22) PCT Filed: May 22, 2017

(86) PCT No.: PCT/JP2017/018955
§ 371 (c)(1),
(2) Date: Dec. 31, 2018

(87) PCT Pub. No.: WO2018/012110
PCT Pub. Date: Jan. 18, 2018

(65) Prior Publication Data
US 2019/0143530 A1    May 16, 2019

(30) Foreign Application Priority Data

Jul. 11, 2016  (JP) .............................. JP2016-136551

(51) Int. Cl.
*G05B 19/04* (2006.01)
*B25J 13/00* (2006.01)
(Continued)

(52) U.S. Cl.
CPC .............. *B25J 13/006* (2013.01); *B25J 3/00* (2013.01); *B25J 3/04* (2013.01); *B25J 5/007* (2013.01);
(Continued)

(58) Field of Classification Search
CPC ... B25J 3/00; B25J 13/006; B25J 9/161; B25J 9/1633; B25J 13/00; B25J 13/025;
(Continued)

(56) References Cited

U.S. PATENT DOCUMENTS 5,497,061 A  *  3/1996  Nonaka ................. B25J 9/1633
                                                        318/568.1
9,532,839 B2 *  1/2017  Seo ........................ A61B 34/37
(Continued)

FOREIGN PATENT DOCUMENTS

| CN | 104972463 A | 10/2015 |
|---|---|---|
| DE | 102015004484 A1 | 10/2015 |

(Continued)

OTHER PUBLICATIONS

International Search Report and Written Opinion of PCT Application No. PCT/JP2017/018955, dated Aug. 1, 2017, 09 pages of ISRWO.

*Primary Examiner* — Harry Y Oh
(74) *Attorney, Agent, or Firm* — Chip Law Group

(57) ABSTRACT

Provided is a processing device that includes a processing unit that estimates a holding force with which an operator holds an operation body on the basis of a model that corresponds to a first robot. The first robot includes the operation body provided in a link connected to a passive articulation and a force sensor that detects a force applied to the operation body. The model regards the force sensor as a virtual articulation.

8 Claims, 10 Drawing Sheets

(51) Int. Cl.
*B25J 3/00* (2006.01)
*B25J 9/16* (2006.01)
*B25J 13/08* (2006.01)
*B25J 13/02* (2006.01)
*B25J 5/00* (2006.01)
*B25J 3/04* (2006.01)

(52) U.S. Cl.
CPC ............ *B25J 9/161* (2013.01); *B25J 9/1633* (2013.01); *B25J 9/1689* (2013.01); *B25J 13/025* (2013.01); *B25J 13/085* (2013.01)

(58) Field of Classification Search
CPC ... B25J 13/085; B25J 3/04; B25J 5/007; B25J 9/1689; Y02E 10/50
See application file for complete search history.

(56) References Cited

U.S. PATENT DOCUMENTS

| | | | |
|---|---|---|---|
| 10,350,765 B2* | 7/2019 | Ueberle | B25J 13/085 |
| 10,434,660 B2* | 10/2019 | Meyer | A61B 34/30 |
| 10,562,191 B2* | 2/2020 | Pipitone | B25J 13/088 |
| 10,568,704 B2* | 2/2020 | Savall | B25J 9/1689 |
| 10,893,913 B2* | 1/2021 | Peine | B25J 9/1605 |
| 2014/0107843 A1* | 4/2014 | Okazaki | B66C 23/005 |
| | | | 700/260 |
| 2015/0066051 A1* | 3/2015 | Kwon | A61B 34/30 |
| | | | 606/130 |
| 2015/0081099 A1* | 3/2015 | Komatsu | B25J 13/085 |
| | | | 700/258 |
| 2015/0290796 A1 | 10/2015 | Iwatake | |
| 2018/0333861 A1* | 11/2018 | Keibel | A63B 21/4034 |

FOREIGN PATENT DOCUMENTS

| | | |
|---|---|---|
| JP | 2008-142810 A | 6/2008 |
| JP | 2009-285099 A | 12/2009 |
| JP | 2012-157946 A | 8/2012 |
| JP | 2015-202537 A | 11/2015 |

* cited by examiner

PROCESSING DEVICE, SYSTEM, AND CONTROL METHOD

CROSS REFERENCE TO RELATED APPLICATIONS

This application is a U.S. National Phase of International Patent Application No. PCT/JP2017/018955 filed on May 22, 2017, which claims priority benefit of Japanese Patent Application No. JP 2016-136551 filed in the Japan Patent Office on Jul. 11, 2016. Each of the above-referenced applications is hereby incorporated herein by reference in its entirety.

TECHNICAL FIELD

The present disclosure relates to a processing device, a system, and a control method.

BACKGROUND ART

Technologies for correcting values of force sensors included in robots have been developed. As a technology for correcting a value of a force sensor included in a robot, for example, a technology disclosed in Patent Literature 1 below can be exemplified.

CITATION LIST

Patent Literature

Patent Literature 1: JP 2008-142810A

DISCLOSURE OF INVENTION

Technical Problem

Articulations included in robots are classified into, for example, articulations driven by motors, actuators, or the like (hereinafter referred to as "active articulations") and articulations not driven by motors or the like (hereinafter referred to as "passive articulations").

When a robot in which an operation body which can be manipulated by an operator is provided in a link connected to a passive articulation is assumed, forces which are applied to the operation body by the operator can include, for example, a force with which the operator holds the operation body (hereinafter referred to as a "holding force") in addition to a force with which the operator manipulates the operation body (hereinafter referred to as an "operating force"). The forces applied to the operation body as described above are detected by, for example, force sensors provided in robots.

Here, in the technology disclosed in Patent Literature 1, for example, a gravitation term obtained through inverse dynamics calculation of a robot and a dynamics term (for example, an inertial force, a Coriolis force, or the like) are used to correct a value of a force sensor. Accordingly, for example, in a case in which the technology disclosed in Patent Literature 1 is used, a net force acting on a force acting between a working tool mounted on a distal end of a robot and a target (a work disclosed in Patent Literature 1) on which work is performed with the working tool is able to be obtained.

However, a term obtained from reverse dynamics calculation indicates a factor caused due to dynamics of a robot. Therefore, for example, even when a term (a result of the inverse dynamics calculation) obtained from the inverse dynamics calculation is simply used as in the technology disclosed in Patent Literature 1, the operator may not estimate a holding force with which the foregoing operator holds the operation body.

The present disclosure proposes a novel and improved processing device, a novel and improved system, and a novel and improved control method capable of estimating a holding force with which an operator holds an operation body in a robot including the operation body provided in a link connected to a passive articulation.

Solution to Problem

According to the present disclosure, there is provided a processing device including a processing unit configured to estimate a holding force with which an operator holds an operation body on the basis of a model that corresponds to a first robot including the operation body provided in a link connected to a passive articulation and a force sensor detecting a force applied to the operation body, the model regarding the force sensor part as a virtual articulation.

In addition, according to the present disclosure, there is provided a system including: a first robot including an operation body provided in a link connected to a passive articulation and a force sensor that detects a force applied to the operation body; a second robot including a force sensor and configured to move on the basis of a motion of the first robot; and a processing device configured to control the motion of the first robot. The processing device includes a processing unit. The processing unit estimates a holding force with which an operator holds an operation body on the basis of a model that corresponds to the first robot and regards the force sensor part as a virtual articulation, estimates an operating force of the operator with respect to the operation body on the basis of a detection result of the force sensor included in the first robot and the estimated holding force, and controls a motion of the first robot on the basis of the estimated operating force.

In addition, according to the present disclosure, there is provided a control method performed by a processing device, the method including: a step of estimating a holding force with which an operator holds the operation body on the basis of a model that corresponds to a robot including the operation body provided in a link connected to a passive articulation and a force sensor detecting a force applied to the operation body, the model regarding the force sensor part as a virtual articulation; a step of estimating the operating force of the operator with respect to the operation body on the basis of a detection result of the force sensor included in the robot and the estimated holding force; and a step of controlling a motion of the robot on the basis of the estimated operating force.

Advantageous Effects of Invention

According to the present technology, it is possible to estimate a holding force with which an operator holds an operation body in a robot including the operation body provided in a link connected to a passive articulation.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
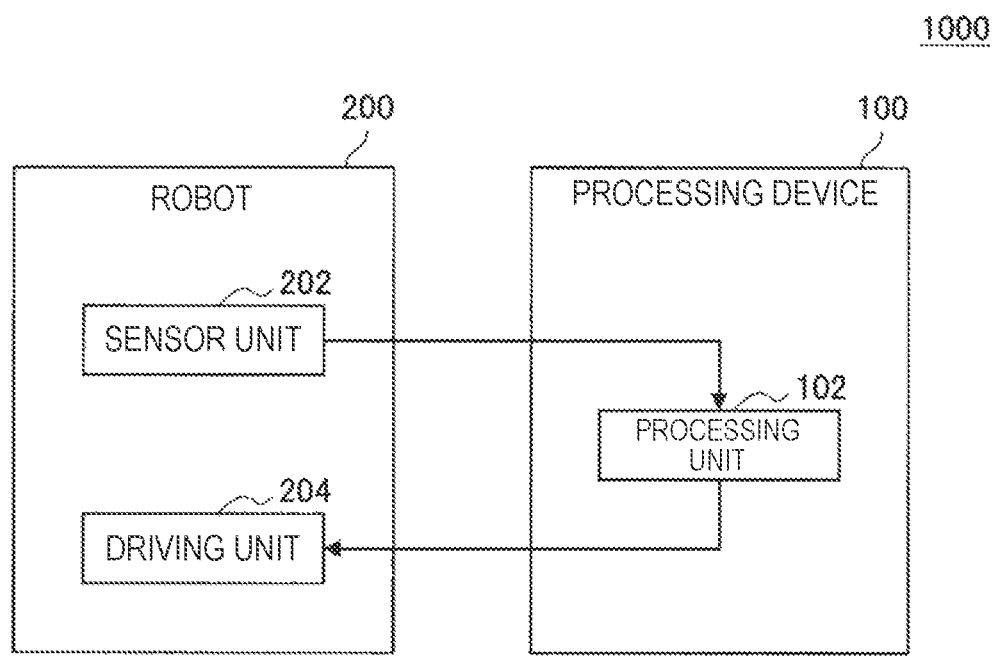
FIG. 1 is an explanatory diagram illustrating an example of a configuration of a system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter the description will be made in the following order.
1. System according to first embodiment
2. System according to second embodiment
3. Program according to present embodiment

System According to First Embodiment

FIG. 1 is an explanatory diagram illustrating an example of a configuration of a system 1000 according to a first embodiment.

The system 1000 includes, for example, a processing device 100 and a robot 200. The processing device 100 and the robot 200 perform, for example, communication in conformity with wired communication of any communication scheme or wireless communication of any communication scheme. In addition, the system 1000 may be configured such that the processing device 100 and the robot 200 perform direct communication or may be configured such that the processing device 100 and the robot 200 perform communication via a network (or another device).

[1] Robot 200 (First Robot)

The robot 200 is, for example, a robot that includes one articulation or two or more articulations including a passive articulation and a link connected to the articulation (a robot that includes a link mechanism including a passive articulation). The robot 200 includes, for example, an operation body that is provided in a link connected to the passive articulation and a force sensor that detects a force applied to an operation body. Here, as the force sensor according to the present embodiment, for example, any sensor capable of detecting a force applied to an operation body, such as "a force sensor of any scheme such as a scheme of using a strain gauge" or "a tactile sensor of any scheme such as a scheme of obtaining a tactile sensation by detecting vibration with a piezoelectric element, a microphone, or the like" can be exemplified. The robot 200 is driven with power supplied from an internal power supply (not shown) such as a battery or power supplied from an external power supply of the robot 200.

In addition, the robot 200 has, for example, a motion sensor that detects a motion of an articulation at a position corresponding to each articulation. As the motion sensor, for example, an encoder or the like can be exemplified.

Further, in a case in which the robot 200 includes an active articulation, the robot 200 has, for example, a driving mechanism that drives the active articulation at a position corresponding to each articulation. As the driving mechanism, for example, a motor and a driver can be exemplified.

Figure 2:
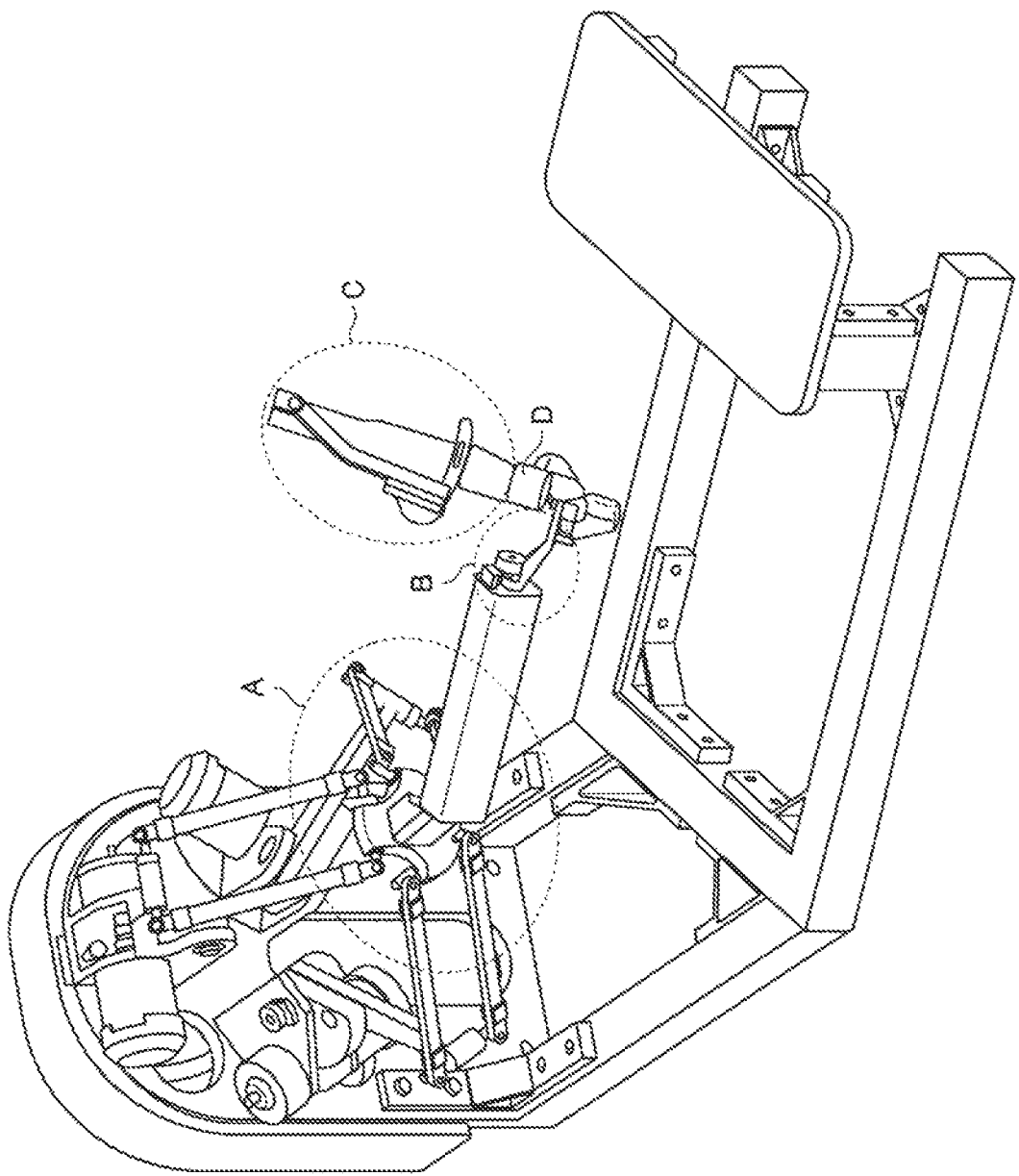
FIG. 2 is an explanatory diagram illustrating an example of a robot (first robot) according to the present embodiment.

FIG. 2 is an explanatory diagram illustrating an example of the robot 200 (the first robot) according to the present embodiment. FIG. 2 illustrates an example of a robot in which three translation axes are realized as an active articulation (indicated by A illustrated in FIG. 2) driven by a motor and three attitude axes are realized as a passive articulation (indicated by B illustrated in FIG. 2).

In the robot 200 illustrated in FIG. 2, an operation body (indicated by C illustrated in FIG. 2) is provided in a link connected to the passive articulation. In addition, in the robot 200 illustrated in FIG. 2, a force sensor (indicated by D illustrated in FIG. 2) that detects a force applied to the operation body is provided in a base portion of the operation body.

Here, FIG. 2 illustrates an example in which the operation body provided in the robot 200 is a stylus type operation device, but the operation body according to the present embodiment is not limited to the example illustrated in FIG. 2. As the operation body according to the present embodiment, for example, an operation device with any shape such as a glove type operation device can be exemplified. In addition, the operation body according to the present embodiment may be any operation device which can be applied to a haptic device. In addition, the robot 200 may have a structure capable of exchanging the operation body.

Hereinafter, a case in which the robot 200 is the robot that has the configuration illustrated in FIG. 2 will be exemplified. Note that it is needless to say that the configuration of the first robot according to the present embodiment is not limited to the example illustrated in FIG. 2.

Referring back to FIG. 1, an example of the configuration of the robot 200 will be described. The robot 200 includes, for example, a sensor unit 202 and a driving unit 204.

For example, the sensor unit 202 detects each of a motion of the articulation included in the robot 200 and a force applied to the operation body.

The sensor unit 202 detects motions of the articulations by a motion sensor such as an encoder. The motion sensor is provided at, for example, a position at which a motion of an articulation can be detected (a position corresponding to the articulation) for each articulation of a motion detection target.

In addition, the sensor unit 202 detects a force applied to the operation body by a force sensor. The force sensor is provided at a position at which a force applied to the operation body can be detected, such as the base portion or the like of the operation body.

The driving unit 204 causes the active articulation to be driven. The driving unit 204 causes the active articulation to be driven by a motor moving the active articulation and a driver moving the motor. For example, the motor and the driver are provided at positions at which the active articulation can be moved for each active articulation. In addition, the driver may be shared by a plurality of articulations.

The driving unit 204 causes the active articulation to be driven on the basis of, for example, a control signal transmitted from an external device such as the processing device 100. In a case in which the processing device 100 transmits the control signal, the processing device 100 functions as a control device that controls a motion of the robot 200. Hereinafter, a case in which the processing device 100 functions as the control device that controls a motion of the robot 200 will be mainly exemplified.

[2] Processing Device 100

The processing device 100 includes, for example, a processing unit 102.

In addition, the processing device 100 may include, for example, a control unit (not shown), a read-only memory (ROM: not shown), a random access memory (RAM: not shown), a storage unit (not shown), a communication unit (not shown), an operation unit (not shown) which can be manipulated by a user, a display unit (not shown) that displays various screens on a display screen, and the like. In the processing device 100, for example, the constituent elements are connected to each other by a bus serving as a data transmission path. The processing device 100 is driven with power supplied from an internal power supply (not shown) such as a battery or power supplied from an external power supply of the processing device 100.

The control unit (not shown) includes one processor or two or more processors including an arithmetic circuit such as a micro processing unit (MPU), various processing circuits, and the like and controls the entire processing device 100. In addition, the control unit (not shown) may serve as, for example, the processing unit 102 in the processing device 100.

Moreover, the processing unit 102 may be constituted by a dedicated (or general-purpose) circuit (e.g., a processor separate from the control unit (not shown), etc.) that can implement the processing of the processing unit 102.

The ROM (not shown) stores control data such as operation parameters and programs used by the control unit (not shown). The RAM (not shown) temporarily stores a program or the like to be executed by the control unit (not shown).

The storage unit (not shown) is storage means included in the processing device 100 and stores, for example, data related to a process of the processing unit 102 such as model information (to be described below) corresponding to the robot 200 (the first robot) and various kinds of data such as various applications.

Here, examples of the storage unit (not shown) include a magnetic recording medium such as a hard disk, a nonvolatile memory such as a flash memory, or the like. In addition, the storage unit (not shown) may be detachable from the processing device 100.

An example of the communication unit (not shown) includes a communication interface to be described later, for example. An example of the operation unit (not shown) includes an operation input device to be described later, for example. In addition, an example of the display unit (not shown) includes a display device to be described later.

Example of Hardware Configuration of Processing Device 100

Figure 3:
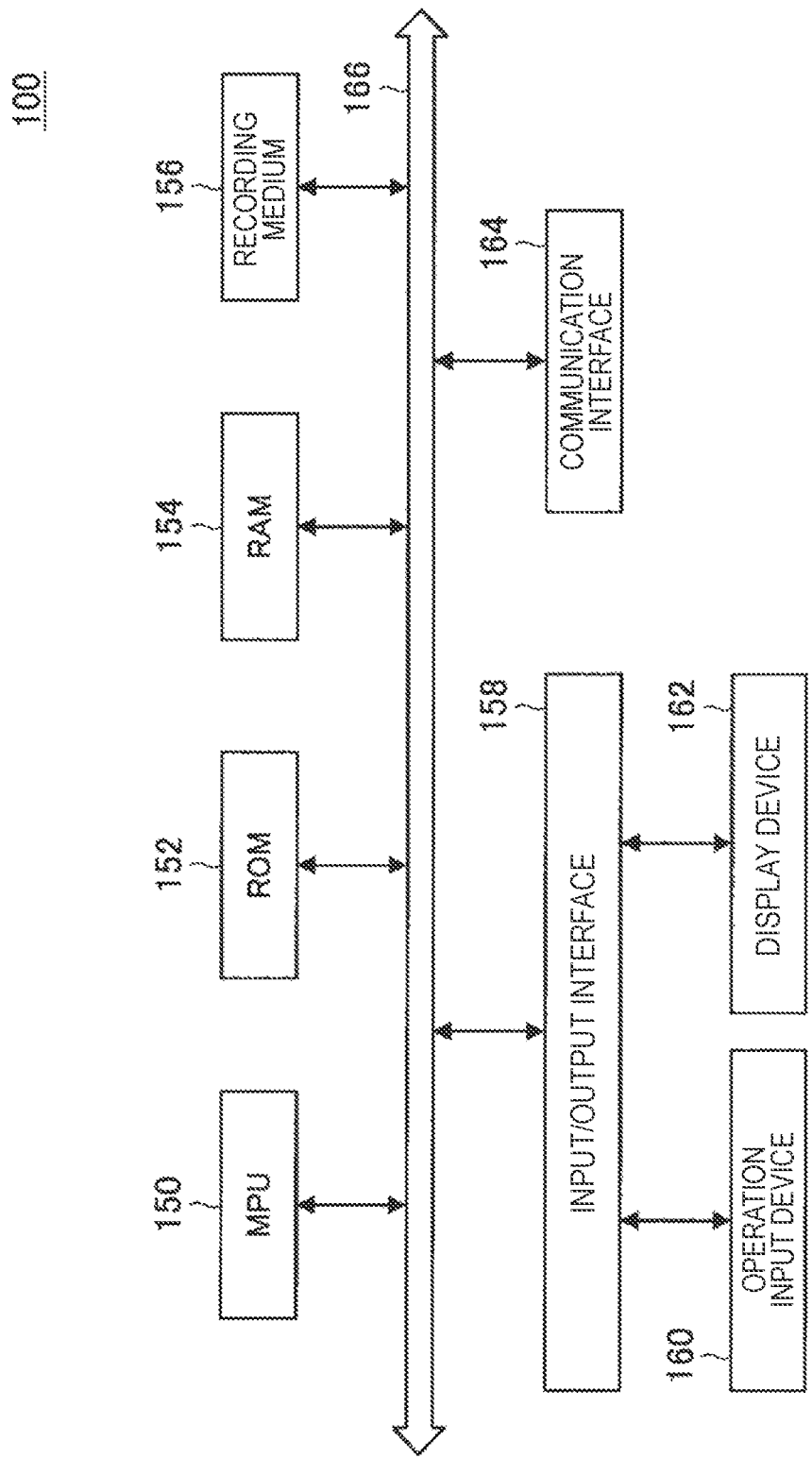
FIG. 3 is an explanatory diagram illustrating an example of a hardware configuration of a processing device according to the first embodiment.

FIG. 3 is a diagram illustrating an example of a hardware configuration of the processing device 100 according to the first present embodiment. The processing device 100 includes, in one example, an MPU 150, a ROM 152, a RAM 154, a recording medium 156, an input/output interface 158, an operation input device 160, a display device 162, and a communication interface 164. In addition, in the processing device 100, the components are connected with each other, in one example, through a bus 166 serving as a data transmission channel. In addition, the processing device 100 is driven by, in one example, power supplied from an internal power supply such as a battery included in the processing device 100, power supplied from a connected external power supply, or the like.

The MPU 150 includes one or more processors constituted by arithmetic circuits such as MPU, various processing circuits, and the like, and functions as the control unit (not shown) that controls the entire processing device 100. In addition, the MPU 150 plays a role of, in one example, the processing unit 102 to be described later in the processing device 100. Moreover, the processing unit 102 may be constituted by a dedicated (or general-purpose) circuit (e.g., a processor separate from the MPU 150, etc.) that can implement the processing of the processing unit 102.

The ROM 152 stores control data such as operation parameters and programs used by the MPU 150. The RAM 154 temporarily stores, in one example, a program to be executed by the MPU 150.

The recording medium 156 functions as a storage unit (not shown) and stores, for example, data related to a process of the processing unit 102 such as model information (to be described below) corresponding to the robot 200 (the first robot) and various kinds of data such as various applications. Here, examples of the recording medium 156 include a magnetic recording medium such as a hard disk and a nonvolatile memory such as a flash memory. In addition, the recording medium 156 may be detachable from the processing device 100.

The input/output interface 158 is used for connection of, in one example, the operation input device 160 or the display device 162. The operation input device 160 functions as the operation unit (not shown), and the display device 162 functions as the display unit (not shown). Here, examples of the input/output interface 158 include a universal serial bus (USB) terminal, a digital visual interface (DVI) terminal, a high-definition multimedia interface (HDMI, registered trademark) terminal, various processing circuits, or the like.

Further, the operation input device 160 is provided on, in one example, the processing device 100, and is connected with the input/output interface 158 inside the processing device 100. Examples of the operation input device 160 include buttons, direction keys, rotary selectors such as a jog dial, or combinations thereof.

Further, the display device 162 is provided on, in one example, the processing device 100, in one example, and is connected with the input/output interface 158 inside the processing device 100. Examples of the display device 162 include a liquid crystal display (LCD), an organic electroluminescence (EL) display (also referred to as an organic light emitting diode (OLED) display), or the like.

Moreover, it is apparent that the input/output interface 158 is capable of being connected to an external device, such as an operation input device (e.g., a keyboard, a mouse, etc.) installed outside of the processing device 100 or an external display device. In addition, the display device 162 may be a device, such as a touch panel, capable of performing both display and user operation.

The communication interface 164 is communication means included in the processing device 100 and functions as a communication unit (not shown). The communication interface 164 performs, for example, wireless or wired communication with an external device or the like such as the robot 200 via a network (or directly). Here, examples of the communication interface 164 include the communication antenna and radio frequency (RF) circuit (wireless communication), the IEEE 802.15.1 port and transmission/reception circuit (wireless communication), the IEEE 802.11 port and transmission/reception circuit (wireless communication), the local area network (LAN) terminal and transmission/reception circuit (wired communication), and the like.

The processing device 100 has, for example, the configuration illustrated in FIG. 3. Note that a hardware configuration of the processing device 100 according to the first embodiment is not limited to the configuration illustrated in FIG. 3.

For example, the processing device 100 may not include the communication interface 164 in a case in which communication with an external device or the like via a connected external communication device is performed or a case in which a process is performed in a standalone manner (for example, a case or the like in which the robot 200 and the processing device 100 illustrated in FIG. 1 are the same device). In addition, the communication interface 164 may be configured to be capable of communicating with one or more external devices or the like by a plurality of communication schemes.

In addition, the processing device 100 can have, for example, a configuration in which one or two or more of the recording medium 156, the operation input device 160, and the display device 162 are not included.

Further, the processing device 100 can have a configuration, in one example, corresponding to an application example of the processing device 100 to be described later.

Further, in one example, some or all of the components (or the components according to the modification) illustrated in FIG. 3 may be implemented with one or more integrated circuits (ICs).

Referring back to FIG. 1, an example of a configuration of the processing device 100 will be described. The processing unit 102 estimates a holding force with which the operator holds the operation body in the robot 200 (the first robot: hereinafter the same applies).

The processing unit 102 estimates a holding force with which the operator holds the operation body on the basis of a model that corresponds to the robot 200 and regards a force sensor as a virtual articulation. The processing unit 102 specifies a model that corresponds to the robot 200 and regards a force sensor as a virtual articulation by reading model information corresponding to the robot 200 stored in, for example, a recording medium such as a storage unit (not shown).

In the recording medium such as a storage unit (not shown), for example, identification information (for example, an ID) indicating a robot and the model information are associated in a table (or a database) or the like and are stored. The processing unit 102 specifies model information associated with identification information matching identification information acquired from the robot 200 with reference to the foregoing table or the like and reads the specified model information from the recording medium such as the storage unit (not shown). Note that it is needless to say that a method of specifying the model that corresponds to the robot 200 and regards the force sensor as the virtual articulation is not limited to the above-described example.

An example of a process related to estimation of a holding force in the processing unit 102 will be described later.

In addition, the processing unit 102 can also control a motion of the robot 200 on the basis of the estimated holding force.

The processing unit 102 estimates an operating force of the operator on the operation body on the basis of a detection result of the force sensor included in the robot 200 and the estimated holding force. The processing unit 102 estimates the operating force by subtracting the estimated holding force from the force applied to the operation body based on the detection result of the force sensor included in the robot 200. The force applied to the operation body based on the detection result of the force sensor may be a value itself indicated by the detection result of the force sensor or may be a value obtained by correcting a value indicated by the detection result of the force sensor.

An example of a process related to the estimation of the operating force in the processing unit 102 will be described later.

Further, the processing unit 102 may control a motion of the robot 200 on the basis of the estimated operating force.

The processing unit 102 controls a motion of the robot 200, for example, by performing "a process of transmitting, to the robot 200, a control signal including a command for acting a motor that causes the active articulation included in the robot 200 to be driven." The control signal is transmitted to the robot 200 via the communication unit (not shown) included in the processing device 100 or an external communication device connected to the processing device 100.

Hereinafter, an example of a configuration of the processing unit 102 and an example of a process in the processing unit 102 will be described exemplifying a case in which the processing unit 102 controls a motion of the robot 200.

[2-1] Example of Configuration for Controlling Motion of Robot 200

Figure 4:
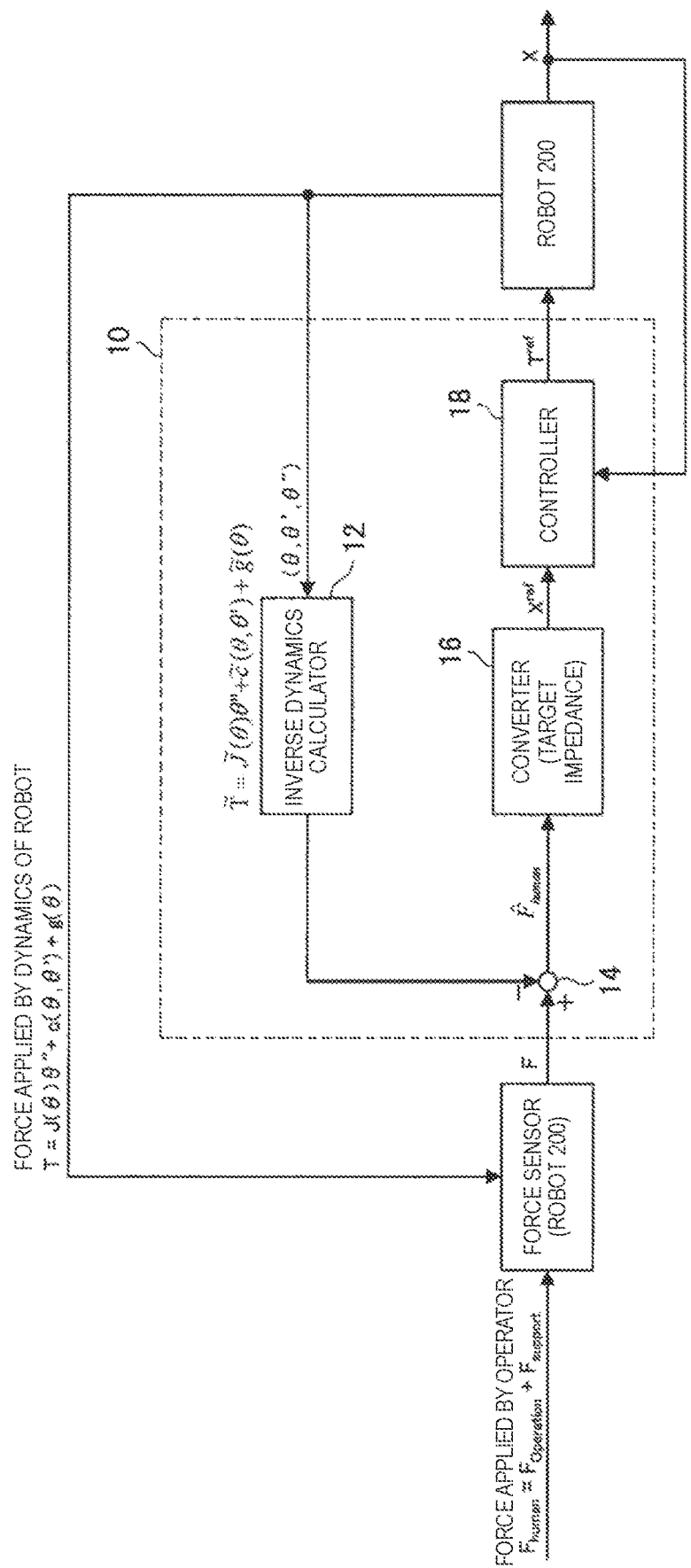
FIG. 4 is an explanatory diagram illustrating an example of a configuration of a processing unit that controls a motion of the robot.

An example of a configuration for controlling a motion of the robot 200 will be described before the example of the configuration of the processing unit 102 is described. FIG. 4 is an explanatory diagram illustrating an example of the configuration of the processing unit 10 that controls a motion of the robot 200.

"$F_{human}$" illustrated in FIG. 4 indicates a force applied to the operation body by the operator. In addition, "$F_{Operation}$" illustrated in FIG. 4 indicates an operating force and "$F_{support}$" illustrated in FIG. 4 indicates a holding force. As illustrated in FIG. 4, a force applied to the operation body of the operator includes an operating force and a holding force.

The processing unit 10 includes, for example, an inverse dynamics calculator 12, an adder 14, a converter 16, and a controller 18.

The inverse dynamics calculator 12 performs inverse dynamics calculation on a detection result "($\theta$, $\theta'$, $\theta''$)" illustrated in FIG. 4) of the motion sensor acquired from the robot 200. Here, "(θ, θ', θ")" illustrated in FIG. 4 indicates (an angle of an articulation, an angular velocity of an articulation, and an angular acceleration of an articulation).

The adder 14 subtracts a value indicated by a result of the inverse dynamics calculation in the inverse dynamics calculator 12 from a value ("F" illustrated in FIG. 4) indicated by a detection result of the force sensor acquired from the robot 200. A calculation result ("F^(hat)$_{human}$" illustrated in FIG. 4) of the adder 14 is a value obtained by correcting a value indicated by a detection result of the force sensor included in the robot 200 and corresponds to an example of a force applied to the operation body and based on the detection result of the force sensor.

The converter 16 converts a calculation result of the adder 14 into an operation space position target value ("X$^{ref}$" illustrated in FIG. 4). The converter 16 converts the calculation result of the adder 14 into the operation space position target value in accordance with, for example, any method capable of converting an input value into the operation space position target value, such as "performing calculation of any algorithm capable of converting the input value into the operation space position target value" or "referring to a table (or a database) in which the input value and the operation space position target value are associated."

The controller 18 transmits, to the robot 200, a control signal including an operation space position target value delivered from the converter 16 and an articulation space torque instruction value ("T$^{ref}$" illustrated in FIG. 4: an example of a command for acting a motor that causes the active articulation included in the robot 200 to be driven) on the basis of data ("X" illustrated in FIG. 4) indicating an operation space position acquired from the robot 200. The controller 18 calculates the articulation space torque instruction value, for example, by performing calculation of any algorithm capable of approaching the operation space position of the robot 200 to the operation space position target value.

The robot 200 moves by moving the active articulation on the basis of the control signal transmitted by the controller 18 of the processing unit 10.

For example, a motion of the robot 200 can be controlled after an influence of the dynamics of the robot 200 is compensated for by performing a process in the processing unit 10 that has the configuration illustrated in FIG. 4.

Here, as illustrated in FIG. 4, the force applied to the operation body by the operator includes the operating force and the holding force. However, in a process in the processing unit 10 illustrated in FIG. 4, the holding force with which the operator holds the operation body of the robot 200 is not considered. Therefore, in a case in which the processing unit 10 illustrated in FIG. 4 is used, control of a motion of the robot 200 (force control of the robot 200) in consideration of only a pure operating force may not be performed.

[2-2] Example of Configuration of Processing Unit 102

Accordingly, the processing unit 102 estimates the holding force, compensates for the estimated holding force, and then controls a motion of the robot 200. The processing unit 102 estimates the holding force and compensates for the estimated holding force, so that the processing device 100 can control a motion of the robot 200 on the basis of a pure operating force.

Figure 5:
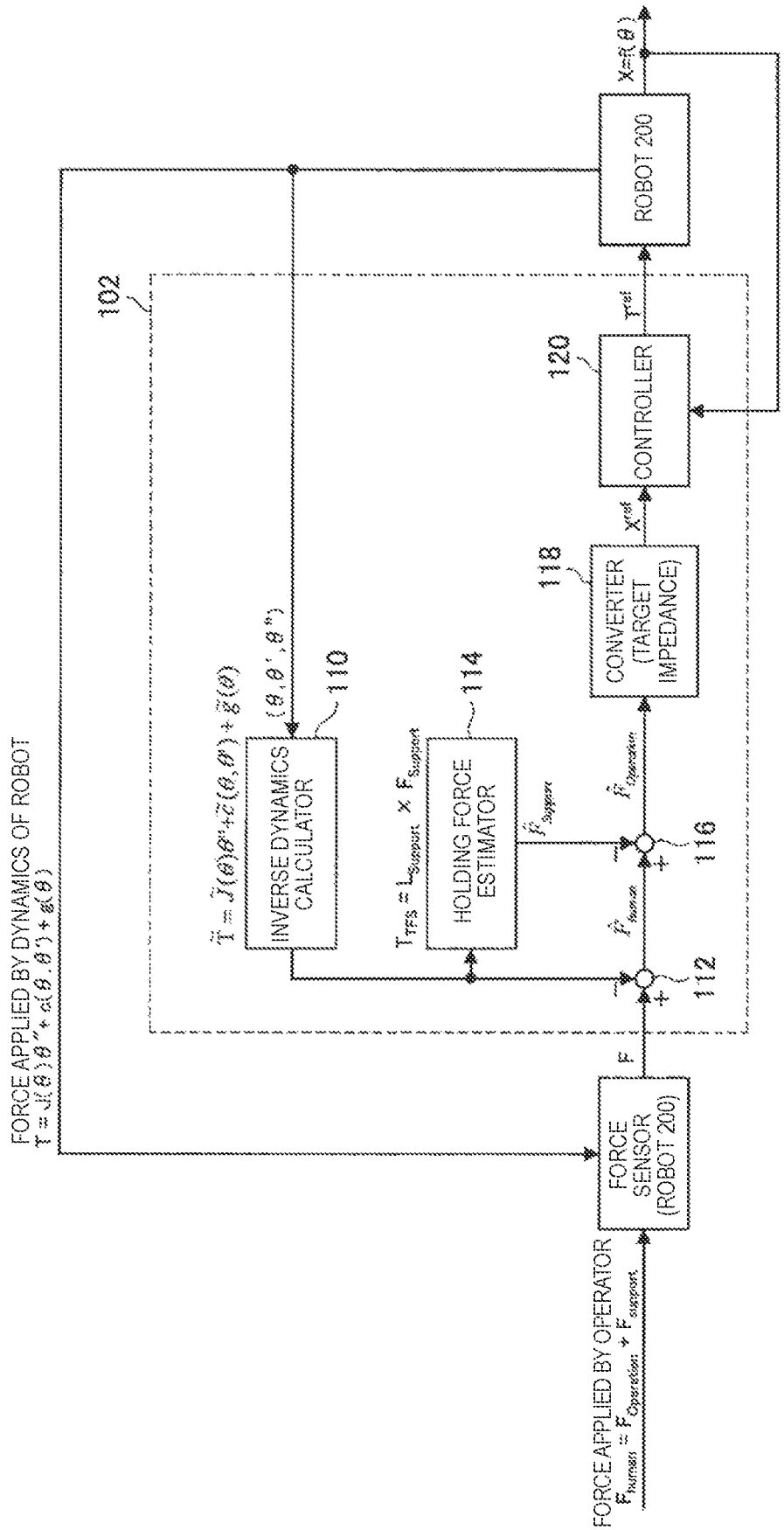
FIG. 5 is an explanatory diagram illustrating an example of a configuration of a processing unit included in the processing device according to the first embodiment.

FIG. 5 is an explanatory diagram illustrating an example of a configuration of the processing unit 102 included in the processing device 100 according to the first embodiment.

"F$_{human}$" illustrated in FIG. 5 indicates a force applied to the operation body by the operator. In addition, "F$_{Operation}$" illustrated in FIG. 5 indicates an operating force and "F$_{support}$" illustrated in FIG. 5 indicates a holding force. As illustrated in FIG. 5, a force applied to the operation body of the operator includes an operating force and a holding force.

The processing unit 102 includes, for example, an inverse dynamics calculator 110, an adder 112, a holding force estimator 114, an adder 116, a converter 118, and a controller 120.

[2-2-1] Inverse Dynamics Calculator 110

The inverse dynamics calculator 110 performs inverse dynamics calculation on a detection result "(θ, θ', θ")" illustrated in FIG. 5) of the motion sensor acquired from the robot 200. Here, "(θ, θ', θ")" illustrated in FIG. 5 indicates (an angle of an articulation, an angular velocity of an articulation, and an angular acceleration of an articulation).

Dynamics of a robot such as the robot 200 is generally expressed in Expression 1 below.

[Math. 1]

$$T = J(\vartheta) \cdot \vartheta' + c(\vartheta, \vartheta') + g(\vartheta) \quad \text{(Expression 1)}$$

Here, the left side of Expression 1 above indicates a torque value of each articulation of the robot. In addition, the first term, the second term, and the third term of the right side of Expression 1 above indicate an inertial force term, a Coriolis force term, and a gravitation term, respectively.

The inverse dynamics calculator 110 performs inverse dynamics calculation for each control period of the robot 200 on the basis of a model that is indicated by model information corresponding to the robot 200 and regards a force sensor as a virtual articulation. The inverse dynamics calculator 110 calculates a virtual articulation force in the virtual articulation in the model indicated by the model information by performing the inverse dynamics calculation.

Here, the virtual articulation force according to the present embodiment is, for example, a virtual force necessary to hold a position and an attitude of the virtual articulation which does not actually move, that is, a virtual force necessary to hold the virtual articulation. The virtual articulation force is expressed by, for example, a torque value of the virtual articulation.

The inverse dynamics calculator 110 calculates a torque value (virtual articulation force) of the virtual articulation by performing the inverse dynamics calculation using a scheme disclosed in, for example, the specification of JP 2007-108955A applied by the present applicant. Note that a method of calculating the torque value of the virtual articulation according to the present embodiment is not limited to the above-described method. The inverse dynamics calculator 110 may perform calculation of any algorithm capable of calculating the torque value of the virtual articulation in the model indicated by the model information.

The torque value (virtual articulation force) of the virtual articulation is expressed in Expression 2 below, for example.

[Math. 2]

$$T_{TFS} = L_{support} \cdot F_{support} \quad \text{(Expression 2)}$$

Here, the left side of Expression 2 above indicates a torque value of a virtual articulation (a virtual force necessary to hold the virtual articulation). In addition, the first term of the right side of Expression 2 above indicates "a distance between a position at which the operator holds the operation body in the robot 200 and the virtual articulation." In addition, the second term of the right side of Expression 2 above indicates "a holding force." As indicated in Expression 2 above, the torque value of the virtual articulation is dynamically identical with a torque value obtained by multiplying "the holding force" by "the distance between the position at which the operator holds the operation body in the robot 200 and the virtual articulation."

[2-2-2] Adder 112

The adder 112 subtracts a value (a torque value of a virtual articulation) indicated by a result of the inverse dynamics calculation in the inverse dynamics calculator 110 from a value ("F" illustrated in FIG. 5) indicated by the detection result of the force sensor acquired from the robot 200.

Through the calculation in the adder 112, a force caused by the dynamics of the robot 200 is removed from the value indicated by the detection result of the force sensor. That is, a calculation result ("F^(hat)$_{human}$" illustrated in FIG. 5) of the adder 112 is a value obtained by correcting the value indicated by the detection result of the force sensor included in the robot 200 and corresponds to an example of a force applied to the operation body and based on the detection result of the force sensor.

[2-2-4] Holding Force Estimator 114

The holding force estimator 114 estimates a holding force with which the operator holds the operation body included in the robot 200 on the basis of a value (a torque value of the virtual articulation) indicated by a result of the inverse dynamics calculation in the inverse dynamics calculator 110.

As indicated in Expression 2 above, the torque value of the virtual articulation is obtained from "the holding force" and "the distance between the position at which the operator holds the operation body in the robot 200 and the virtual articulation." In addition, the torque value of the virtual articulation is obtained by the inverse dynamics calculator 110. Accordingly, when "the distance between the position at which the operator holds the operation body in the robot 200 and the virtual articulation" is decided, "the holding force" can be estimated form Expression 2 above.

Here, "the distance between the position at which the operator holds the operation body in the robot 200 and the virtual articulation" is included in, for example, the model information corresponding to the robot 200. In addition, "the distance between the position at which the operator holds the operation body in the robot 200 and the virtual articulation" may be stored as different data from the model information in a recording medium such as a storage unit (not shown). As "the distance between the position at which the operator holds the operation body in the robot 200 and the virtual articulation," for example, "a distance between a standard position set in the operation body included in the robot 200 and a position at which the force sensor is provided in the robot 200" can be exemplified.

The holding force estimator 114 specifies, for example, "the distance between the position at which the operator holds the operation body in the robot 200 and the virtual articulation" with reference to the model information (or the different data from the model information) corresponding to the robot 200. Then, the holding force estimator 114 estimates "the holding force" from Expression 2 above on the basis of the torque value of the virtual articulation delivered from the inverse dynamics calculator 110 and the specified "distance between the position at which the operator holds the operation body in the robot 200 and the virtual articulation."

[2-2-4] Adder 116

The adder 116 subtracts a calculation result ("F^(hat)$_{support}$" illustrated in FIG. 5) of the holding force estimator 114 from the calculation result ("F^(hat)$_{human}$" illustrated in FIG. 5) of the adder 112. That is, the calculation result ("F^(hat)$_{Operation}$" illustrated in FIG. 5) of the adder 116 indicates "a value obtained by subtracting the holding force estimated from a force applied to the operation body and based on the detection result of the force sensor."

Accordingly, the calculation result of the adder 116 indicates an estimation result of a pure operating force in which the estimated holding force is compensated for.

[2-2-5] Converter 118

The converter 118 converts a calculation result of the adder 116 into an operation space position target value ("X$^{ref}$" illustrated in FIG. 5). The converter 118 converts the calculation result of the adder 116 into the operation space position target value in accordance with, for example, any method capable of converting an input value into the operation space position target value, such as "performing calculation of any algorithm capable of converting the input value into the operation space position target value" or "referring to a table (or a database) in which the input value and the operation space position target value are associated."

[2-2-6] Controller 120

The controller 120 transmits, to the robot 200, a control signal including an operation space position target value delivered from the converter 118 and an articulation space torque instruction value ("T$^{ref}$" illustrated in FIG. 5: an example of a command for acting a motor that causes the active articulation included in the robot 200 to be driven) on the basis of data ("X" illustrated in FIG. 5) indicating an operation space position acquired from the robot 200. The controller 120 calculates the articulation space torque instruction value, for example, by performing calculation of any algorithm capable of approaching the operation space position of the robot 200 to the operation space position target value.

The robot 200 moves by moving the active articulation on the basis of the control signal transmitted by the controller 120 of the processing unit 102.

The processing unit 102 has, for example, the configuration illustrated in FIG. 5.

Here, the processing unit 102 includes, for example, the inverse dynamics calculator 110 and the holding force estimator 114, and thus estimates a holding force with which the operator holds the operation body of the robot 200 on the basis of a model that corresponds to the robot 200 (the first robot) and regards a force sensor as a virtual articulation.

Accordingly, the processing device 100 including the processing unit 102 illustrated in FIG. 5 can estimate a holding force with which the operator holds the operation body in a robot including an operation body provided in a link connected to a passive articulation, as in the robot 200.

In addition, the processing unit 102 further includes the adder 116, and thus compensates for the estimated holding force.

Accordingly, the processing device 100 including the processing unit 102 illustrated in FIG. 5 can compensate the estimated holding force and estimate a pure operating force.

In addition, the processing unit 102 further includes the converter 118 and the controller 120, and thus controls a motion of the robot 200 on the basis of the estimated operating force.

Accordingly, the processing device 100 including the processing unit 102 illustrated in FIG. 5 can compensate the influence of the dynamics of the robot 200 and the estimated holding force, and then can control the motion of the robot 200.

Note that a configuration of the processing unit 102 according to the first embodiment is not limited to the configuration illustrated in FIG. 5.

For example, the processing unit 102 may have a configuration in which the adder 112, the adder 116, the converter 118, and the controller 120 illustrated in FIG. 5 are not included. Even in the configuration in which the adder 112, the adder 116, the converter 118, and the controller 120 illustrated in FIG. 5 are not included, the processing unit 102 can estimate a holding force with which the operator holds the operation body in the robot 200 (an example of a robot including an operation body provided in a link connected to a passive articulation).

In addition, the processing unit 102 may have, for example, a configuration in which the converter 118 and the controller 120 illustrated in FIG. 5 are not included. Even in the configuration in which the converter 118 and the controller 120 illustrated in FIG. 5 are not included, the processing unit 102 can compensate the estimated holding force and estimate a pure operating force.

Note that in a case in which the processing unit 102 has the configuration in which the adder 112, the adder 116, the converter 118, and the controller 120 illustrated in FIG. 5 are not included or the configuration in which the converter 118 and the controller 120 illustrated in FIG. 5 are not included, a motion of the robot 200 may be controlled when the processing device 100 and an external device cooperate to perform a process.

In addition, in the configuration illustrated in FIG. 5, the process in the processing unit 102 is divided for convenience. Accordingly, the configuration of the processing unit 102 is not limited to the configuration illustrated in FIG. 5 (also including the configuration according to the foregoing modification example), but processes in some or all of the constituent elements illustrated in FIG. 5 may be performed by common hardware.

[3] Process Related to Control Method According to Present Embodiment

Next, an example of a process related to a control method according to the present embodiment will be described. Hereinafter, a case in which the processing device 100 performs the process related to the control method of controlling the robot 200 (an example of a robot including an operation body provided in a link connected in a passive articulation and a force sensor detecting a force applied to the operation body) will be exemplified.

As described above, the processing device 100 estimates a holding force with which the operator holds the operation body on the basis of the model that corresponds to the robot 200 and regards the force sensor as the virtual articulation. For example, in the processing device 100 including the processing unit 102 illustrated in FIG. 5, a process of estimating the holding force may be performed in the inverse dynamics calculator 110 and the holding force estimator 114.

In addition, the processing device 100 estimates an operating force of the operator with respect to the operation body on the basis of a detection result of the force sensor included in the robot 200 and the estimated holding force. For example, in the processing device 100 including the processing unit 102 illustrated in FIG. 5, the process of estimating the operating force is performed in the adder 116.

Then, the processing device 100 controls a motion of the robot 200 on the basis of the estimated operating force. For example, in the processing device 100 including the processing unit 102 illustrated in FIG. 5, the process of controlling the motion of the robot 200 is performed in the converter 118 and the controller 120.

The processing device 100 controls the motion of the robot 200, for example, by performing the process of estimating the holding force, the process of estimating the operating force, and the process of controlling the motion of the robot 200, as described above.

Figure 6:
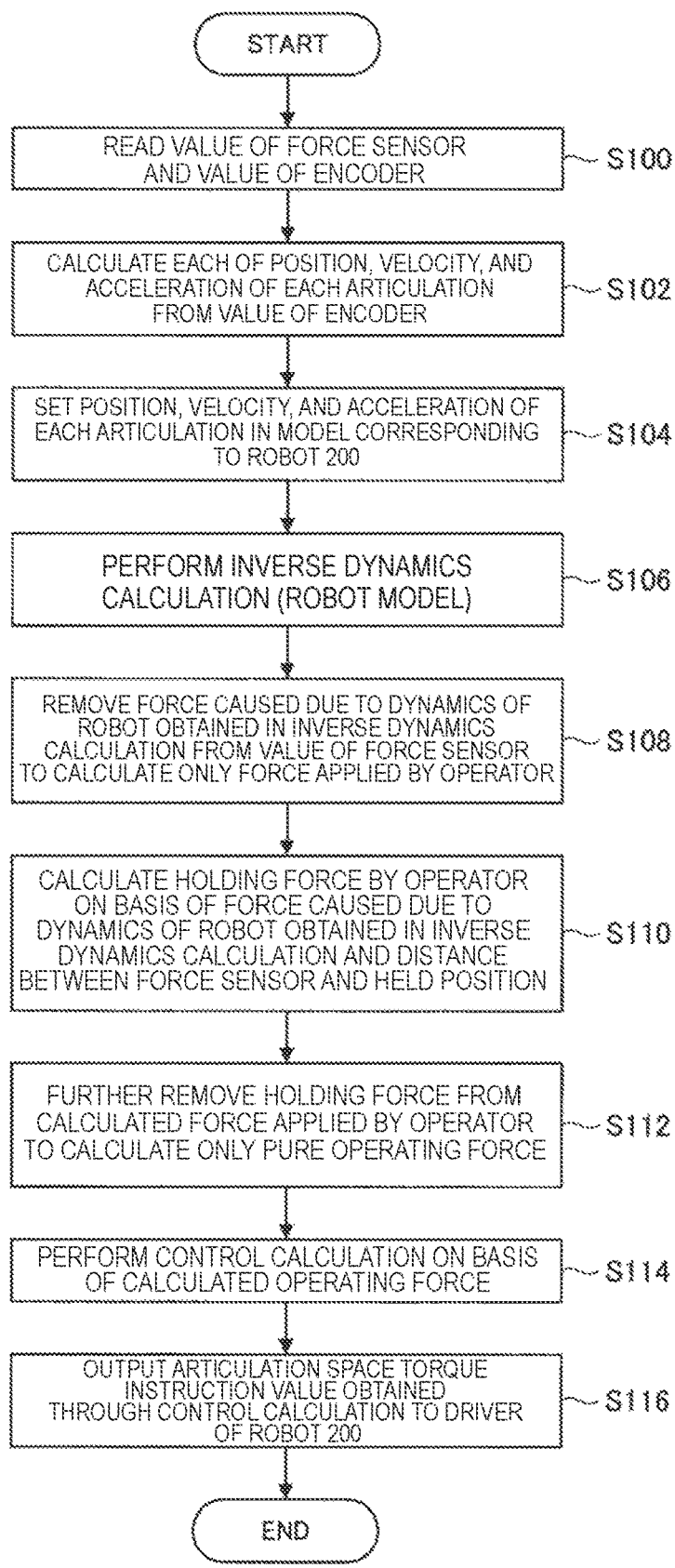
FIG. 6 is a flowchart illustrating an example of a process related to a control method according to the present embodiment.

FIG. 6 is a flowchart illustrating an example of a process related to a control method according to the present embodiment. FIG. 6 illustrates an example of a process of controlling a motion of the robot 200 in the processing device 100 including the processing unit 102 illustrated in FIG. 5. The process illustrated in FIG. 6 in the processing device 100 is performed, for example, for each control period of the robot 200 in the processing unit 102.

The processing device 100 reads a value of the force sensor and a value of the encoder included in the robot 200 (S100). The value of the force sensor and the value of the encoder may be transmitted to the processing device 100 autonomously by the robot 200 or may be transmitted to the robot 200 autonomously by the processing device 100.

The processing device 100 calculates a position (an angle of the articulation), a velocity (an angular velocity of the articulation), and an acceleration (an angular acceleration of the articulation) in each articulation of the robot 200 from the value of the encoder (S102).

The processing device 100 sets the position (the angle of the articulation), the velocity (the angular velocity of the articulation), and the acceleration (an angular acceleration of the articulation) calculated in step S102 in the model corresponding to the robot 200 (S104). The processing device 100 specifies, for example, a model corresponding to the robot 200 with reference to model information corresponding to the robot 200 and stored in a recording medium such as a storage unit (not shown).

The processing device 100 performs inverse dynamics calculation to calculate a virtual articulation force in the virtual articulation in the model corresponding to the robot 200 (S106).

The processing device 100 performs, for example, the inverse dynamics calculation using information regarding the operation body corresponding to the robot 200. As the information regarding the operation body, for example, physical data related to the operation body, such as a mass of the operation body, inertia (a rotating system inertia moment) of the operation body, and data indicating one or two or more of the center of gravity of the operation body, can be exemplified. The information regarding the operation body is stored in, for example, a recording medium such as a storage unit (not shown).

More specifically, the processing device 100 performs the inverse dynamics calculation using a scheme disclosed in, for example, the specification of JP 2007-108955A applied by the present applicant.

For example, as described above, even when one or both of the shape and the structure of the operation body included in the robot 200 are changed, the processing device 100 can estimate a holding force with which the operator holds the operation body by performing the inverse dynamics calculation using the information regarding the operation body included in the robot 200. In addition, in a case in which the processing device 100 performs the inverse dynamics calculation using the information regarding the operation body included in the robot 200, the robot 200 (the first robot) included in the system 1000 can have a structure capable of exchanging the operation body.

The processing device 100 removes a force caused due to the dynamics of the robot 200 from the value of the force sensor to calculate only a force applied by the operator (S108).

The processing device 100 calculates a holding force with which the operator holds the operation body on the basis of "the force caused due to the dynamics of the robot 200 obtained in the inverse dynamics calculation in step S106" and "the distance between the standard position set in the operation body included in the robot 200 and the position at which the force sensor is provided in the robot 200" (an example of a distance between a position at which the operator holds the operation body and the virtual articulation) (S110).

The processing device 100 removes the holding force calculated in step S110 from the force applied by the operator and calculated in step S108 to calculate only a pure operating force (S112).

The processing device 100 performs control calculation to control a motion of the robot 200 on the basis of the operating force calculated in step S112 (S114). As the control calculation in step S114, for example, calculation of any algorithm capable of obtaining an articulation space torque instruction value by which an operation space position of the robot 200 approaches an operation space position target value can be exemplified.

The processing device 100 outputs a control signal including the articulation space torque instruction value obtained through the control calculation in step S114 to a driver that causes the motor of the robot 200 to be driven (S116).

The processing device 100 performs, for example, the process illustrated in FIG. 6 as a process related to the control method according to the present embodiment. Note that it is needless to say that an example of the process related to the control method according to the present embodiment is not limited to the example illustrated in FIG. 6.

[4] Advantageous Effects Obtained in System 1000 and Modification Examples of System 1000

The system 1000 according to the first embodiment includes the robot 200 (the first robot) that has the above-described function and configuration the processing device 100 that has the above-described function and configuration.

Since the system 1000 includes the processing devices 100, for example, the following advantageous effects can be obtained. Note that it is needless to say that the advantageous effects in the system 1000 are not limited to the following examples.

It is possible to estimate a holding force with which an operator holds an operation body in a robot including the operation body provided in a link connected to a passive articulation as in the robot 200. The holding force is estimated on the basis of the model that regards the force sensor as the virtual articulation. Therefore, even when an attitude of the operation body included in the robot 200 is changed because of an operation of the operator, the holding force with which the operator holds the operation body can be estimated.

It is possible to compensate the estimated holding force and estimate a pure operating force with respect to the operation body included in the robot 200.

Since the influence of the dynamics of the robot 200 and the estimated holding force are compensated for and then a motion of the robot 200 can be controlled, it is possible to perform control in consideration of an operating force of the operator with respect to the operation body included in the robot 200.

Note that a configuration of the system according to the first embodiment is not limited to the example illustrated in FIG. 1.

For example, the processing device 100 and the robot 200 illustrated in FIG. 1 may be the same device. As a case in which the processing device 100 and the robot 200 may be the same device, an example in which a robot including an operation body provided in a link connected to a passive articulation has the function and the configuration of the processing device 100 can be given.

[5] Application Example of System According to First Embodiment

The processing device has been exemplified above as a constituent element of the system according to the first embodiment, but the present embodiment is not limited to the example. The present embodiment can be applied to various devices, for example, a computer such as a personal computer (PC) or a server, a communication device such as a smartphone, a tablet device, and a game device. In addition, the present embodiment can also be applied to, for example, an IC which can be embedded in the foregoing device. Further, as described above, the embodiment can also be applied to a robot including an operation body provided in a link connected to a passive articulation.

In addition, the robot including the operation body provided in the link connected to the passive articulation has been described as a constituent element of the system according to the first embodiment, but a robot according to the present embodiment is not limited to the example. The present embodiment can be applied to any device which includes a passive articulation and can be operated by an operator, for example, a haptic device including a passive articulation such as a type of haptic device in which three attitude axes are passive articulations.

System According to Second Embodiment

Figure 7:
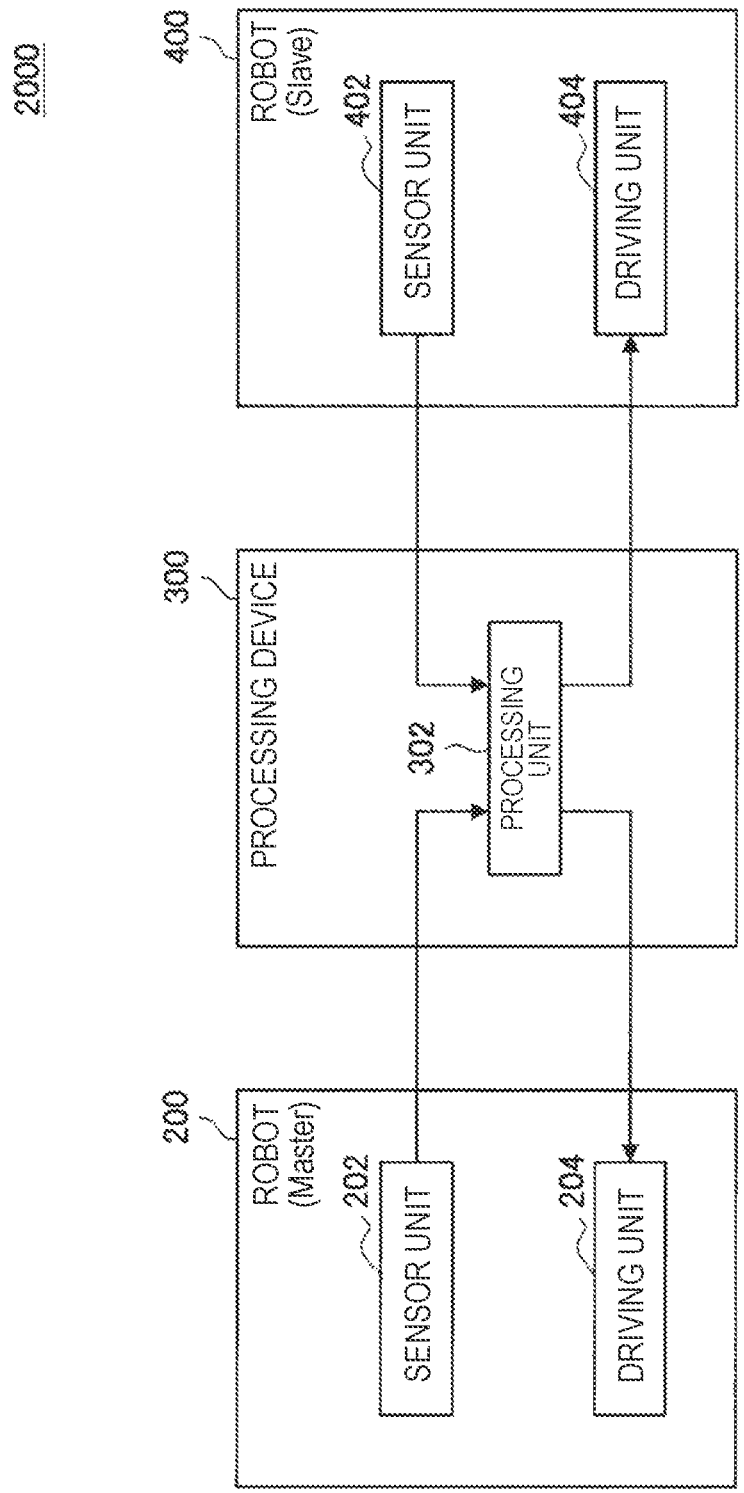
FIG. 7 is an explanatory diagram illustrating an example of a configuration of a system according to a second embodiment.

Note that a system according to the present embodiment is not limited to the system according to the above-described first embodiment. FIG. 7 is an explanatory diagram illustrating an example of a configuration of a system 2000 according to a second embodiment.

The system 2000 includes, for example, a processing device 300, a robot 200 (first robot), and a robot 400 (second robot). The processing device 300 and the robot 200, and the processing device 300 and the robot 400 perform, for example, communication in conformity with wired communication of any communication scheme or wireless communication of any communication scheme. In addition, the system 2000 may be configured such that the processing device 300 and the robot 200 perform direct communication or may be configured such that the processing device 300 and the robot 200 perform communication via a network (or another device). In addition, the system 2000 may be configured such that the processing device 300 and the robot 400 perform direct communication or may be configured such that the processing device 300 and the robot 400 perform communication via a network (or another device).

[I] Robot 200 (First Robot)

The robot 200 is the first robot included in the system 2000. The robot 200 has the same function and configuration as those of the robot 200 according to the first embodiment.

[II] Robot 400 (Second Robot)

The robot 400 is a second robot included in the system 2000. The robot 400 includes a force sensor and moves on the basis of a motion of the robot 200 (the first robot). The robot 400 is driven with power supplied from an internal power supply (not shown) such as a battery or power supplied from an external power supply of the robot 400.

That is, the system 2000 is a bilateral system. In the system 2000, the robot 200 corresponds to a master-side device. In the system 2000, the robot 400 corresponds to a slave-side device.

The robot 400 is, for example, a robot (a robot that includes a link mechanism including an active articulation) that includes one active articulation or two or more active articulations for movement corresponding to a motion of the robot 200 and a link connected to the active articulation. The robot 400 includes, for example, a motion sensor that detects a motion of the active articulation at a position corresponding to each active articulation. As the motion sensor, for example, an encoder or the like can be exemplified.

In addition, the robot 400 includes, for example, a driving mechanism that drives the active articulation at a position corresponding to each active articulation. As the driving mechanism, for example, a motor and a driver can be exemplified.

Figure 8:
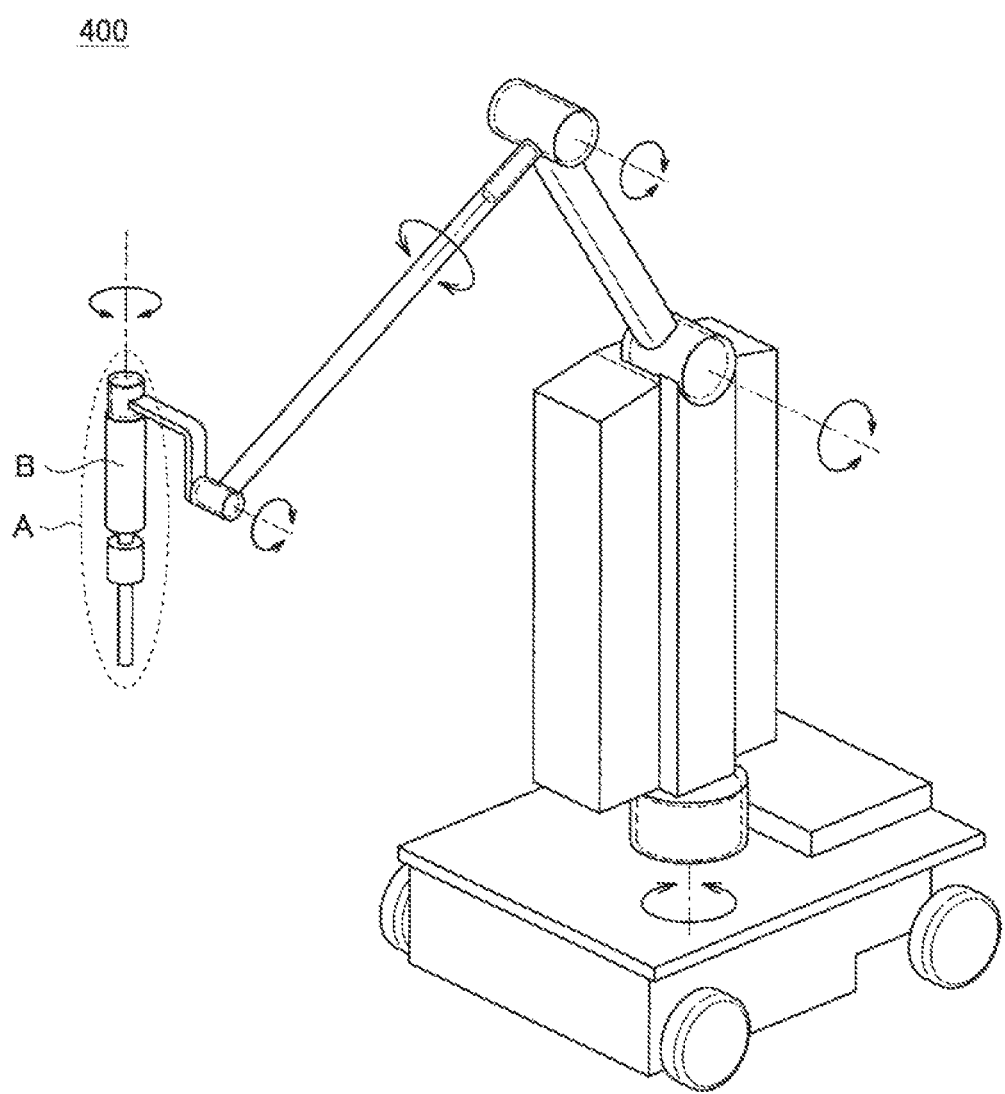
FIG. 8 is an explanatory diagram illustrating an example of a robot (second robot) according to the present embodiment.

FIG. 8 is an explanatory diagram illustrating an example of the robot 400 (the second robot) according to the present embodiment.

In the robot 400 illustrated in FIG. 8, various sensors (for example, an origin sensor, a limit sensor, an encoder, a microphone, an acceleration sensor, and the like) are provided in a distal end (indicated by A illustrated in FIG. 8) of an arm. In addition, in the robot 400 illustrated in FIG. 8, a force sensor (indicated B illustrated in FIG. 8) is provided at the distal end of the arm.

Hereinafter, a case in which the robot 400 is the robot that has the configuration illustrated in FIG. 8 will be exemplified. Note that it is needless to say that the configuration of the second robot according to the present embodiment is not limited to the example illustrated in FIG. 8.

Referring back to FIG. 7, an example of the configuration of the robot 400 will be described. The robot 400 includes, for example, a sensor unit 402 and a driving unit 404.

For example, the sensor unit 402 detects a motion of the articulation included in the robot 400.

The sensor unit 402 detects motions of the articulations by a motion sensor such as an encoder. The motion sensor is provided at, for example, a position at which a motion of an articulation can be detected (a position corresponding to the articulation) for each articulation of a motion detection target.

The driving unit 404 causes the active articulation to be driven. The driving unit 404 causes the active articulation to be driven by a motor moving the active articulation and a driver moving the motor. For example, the motor and the driver are provided at positions at which the active articulation can be moved for each active articulation. In addition, the driver may be shared by a plurality of articulations.

The driving unit 404 causes the active articulation to be driven on the basis of, for example, a control signal transmitted from an external device such as the processing device 300. In a case in which the processing device 300 transmits the control signal, the processing device 300 functions as a control device that controls a motion of the robot 400. Hereinafter, a case in which the processing device 300 functions as the control device that controls a motion of the robot 400 will be exemplified.

[III] Processing Device 300

The processing device 300 includes, for example, a processing unit 302.

In addition, the processing device 300 may include, for example, a control unit (not shown), a ROM (not shown), a RAM (not shown), a storage unit (not shown), a communication unit (not shown), an operation unit (not shown) which can be manipulated by a user, a display unit (not shown) that displays various screens on a display screen, and the like. In the processing device 300, for example, the constituent elements are connected to each other by a bus serving as a data transmission path. The processing device 300 is driven with power supplied from an internal power supply (not shown) such as a battery or power supplied from an external power supply of the processing device 300.

The control unit (not shown) includes one processor or two or more processors including an arithmetic circuit such as a MPU, various processing circuits, and the like and controls the entire processing device 300. In addition, the control unit (not shown) may serve as, for example, the processing unit 302 in the processing device 300.

Moreover, the processing unit 302 may be constituted by a dedicated (or general-purpose) circuit (e.g., a processor separate from the control unit (not shown), etc.) that can implement the processing of the processing unit 302.

The ROM (not shown) stores control data such as operation parameters and programs used by the control unit (not shown). The RAM (not shown) temporarily stores a program or the like to be executed by the control unit (not shown).

The storage unit (not shown) is storage means included in the processing device 300 and stores, for example, data related to a process of the processing unit 302 such as model information (to be described below) corresponding to the robot 200 (the first robot) and various kinds of data such as various applications.

Here, examples of the storage unit (not shown) include a magnetic recording medium such as a hard disk, a nonvolatile memory such as a flash memory, or the like. In addition, the storage unit (not shown) may be detachable from the processing device 300.

An example of the communication unit (not shown) includes the above-described communication interface 164, for example. An example of the operation unit (not shown) includes the above-described operation input device 160, for example. In addition, an example of the display unit (not shown) includes the above-described display device 162.

Hardware Configuration Example of Processing Device 300

The processing device 300 can have, for example, the same configuration as the processing device 100 (also including the configuration according to the modification example) illustrated in FIG. 3 according to the first embodiment.

Referring back to FIG. 7, an example of a configuration of the processing device 300 will be described. The processing unit 302 has basically the same function as the processing unit 102 included in the processing device 100 according to the first embodiment.

In addition, the processing unit 302 further controls a motion of the robot 400 included in the system 2000 which is a bilateral system in addition to the control of a motion of the robot 200.

Figure 9:
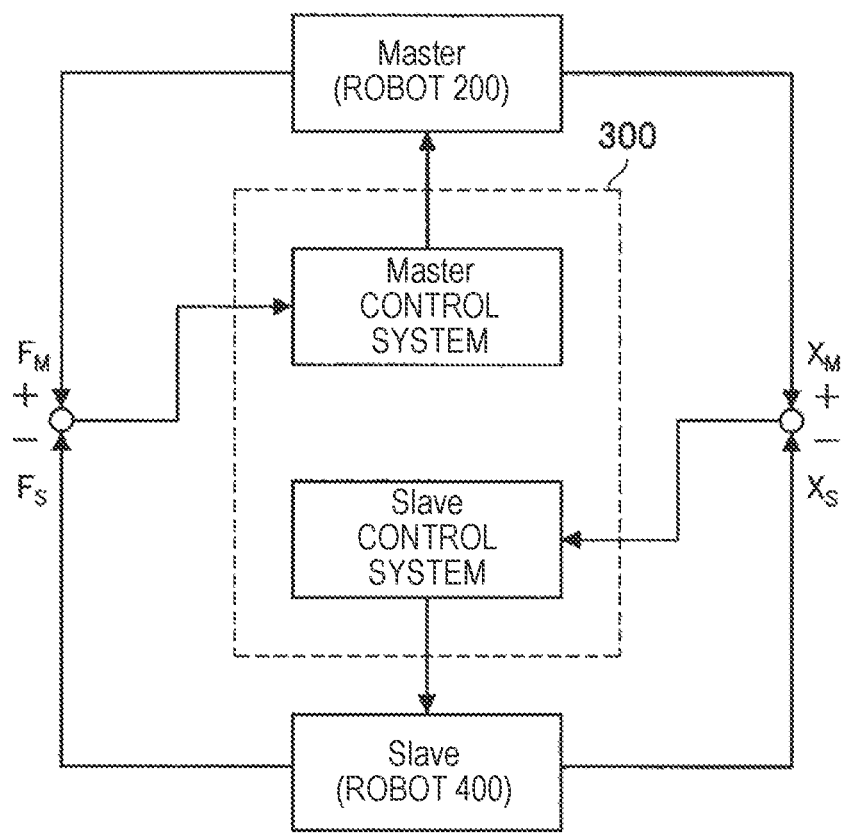
FIG. 9 is an explanatory diagram illustrating an overview of a bilateral control method in a processing device according to the second embodiment.

FIG. 9 is an explanatory diagram illustrating an overview of a bilateral control method in the system 2000 according to the second embodiment.

As illustrated in FIG. 9, in the system 2000, the processing device 300 performs force feedback control using a detection result of the force sensor included in the robot 200 which is a master-side device and a detection result of the force sensor included in the robot 400 which is a slave-side device. Note that it is needless to say that the bilateral control method in the system 2000 is not limited to the example illustrated in FIG. 9.

Hereinafter, in the system 2000, an example of a configuration of the processing unit 302 related to control of a motion of the robot 200 (a master-side device) will be described exemplifying a case in which the force feedback bilateral control method illustrated in FIG. 9 is used.

As described above, the robot 400 a slave-side device in the bilateral system and the processing unit 302 controls a motion of the robot 400 such that the robot 400 moves to correspond to a motion of the robot 200 (the master-side device). The processing unit 302 controls, for example, a motion of the robot 400 by transmitting, to the robot 400, a control signal including a command for acting a motor that causes the active articulation included in the robot 400 to be driven to correspond to a motion of the robot 200. Hereinafter, a configuration of the processing unit 302 related to control of a motion of the robot 400 (the slave-side device) will not be described. In the processing unit 302, for example, the controller 120 included in the processing unit 302 to be described below or a controller (a controller separate from the controller 120) that controls the motion of the robot 400 may perform the process related to control of a motion of the robot 400.

Figure 10:
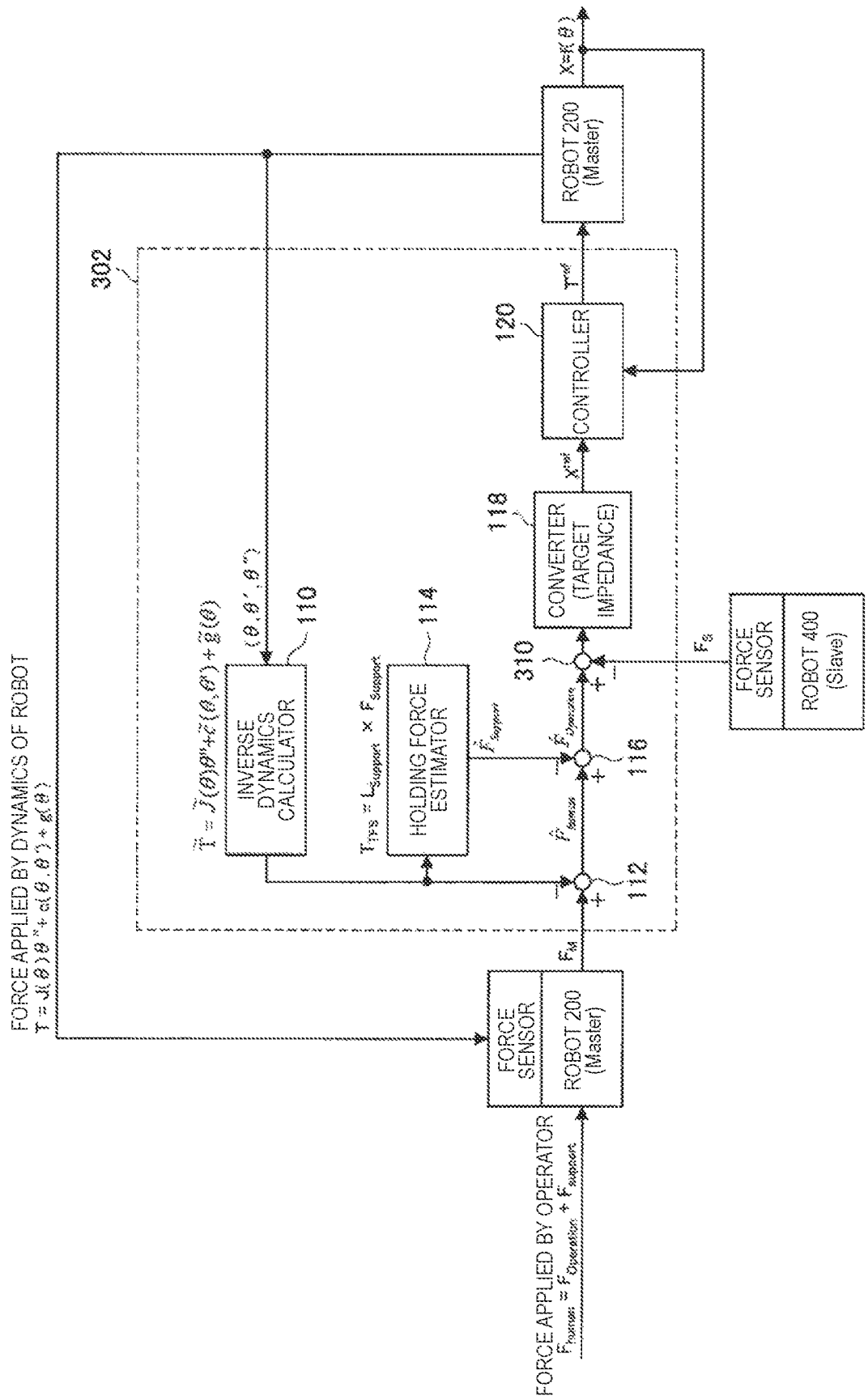
FIG. 10 is an explanatory diagram illustrating an example of a configuration of a processing unit included in the processing device according to the second embodiment.

FIG. 10 is an explanatory diagram illustrating an example of a configuration of the processing unit 302 included in the processing device 300 according to the second embodiment.

In a way similar to FIG. 5, "$F_{human}$" illustrated in FIG. 10 indicates a force applied to the operation body by the operator. In addition, in a way similar to FIG. 5, "$F_{Operation}$" illustrated in FIG. 10 indicates an operating force and "$F_{support}$" illustrated in FIG. 10 indicates a holding force in a way similar to FIG. 5. As illustrated in FIG. 10, a force applied to the operation body of the operator includes an operating force and a holding force.

In addition, in FIG. 10, a value indicated by the detection result of the force sensor acquired from the robot 200 is denoted by "$F_M$" and a value indicated by the detection result of the force sensor acquired from the robot 400 is denoted by "$F_S$."

The processing unit 302 includes, for example, an inverse dynamics calculator 110, an adder 112, a holding force estimator 114, an adder 116, an adder 310, a converter 118, and a controller 120.

[III-1] Inverse Dynamics Calculator 110, Adder 112, Holding Force Estimator 114, and Adder 116

The inverse dynamics calculator 110, the adder 112, the holding force estimator 114, and the adder 116 illustrated in FIG. 10 according to the second embodiment have the same configurations and functions as the inverse dynamics calculator 110, the adder 112, the holding force estimator 114, and the adder 116 described with reference to FIG. 5 according to the first embodiment. Accordingly, the inverse dynamics calculator 110, the adder 112, the holding force estimator 114, and the adder 116 illustrated in FIG. 10 according to the second embodiment will be not described.

[III-2] Adder 310

The adder 310 subtracts the value ("$F_S$" illustrated in FIG. 10) indicated by the detection result of the force sensor acquired from the robot 400 from the calculation result ("$\hat{F}_{Operation}$" illustrated in FIG. 10) of the adder 116.

Through the process in the adder 310, "the force feedback control in which the detection result of the force sensor included in the robot 200 (the master-side device) and the detection result of the force sensor included in the robot 400 (the slave-side device) are used," as illustrated in FIG. 9, is realized.

[III-3] Converter 118 and Controller 120

The converter 118 and the controller 120 illustrated in FIG. 10 according to the second embodiment have the same configurations and functions as the converter 118 and the controller 120 described with reference to FIG. 5 according to the first embodiment.

The converter 118 according to the second embodiment converts the calculation result of the adder 310 into an operation space position target value ("$X^{ref}$" illustrated in FIG. 10). Then, the controller 120 according to the second embodiment transmits, to the robot 200, a control signal including an articulation space torque instruction value ("$T^{ref}$" illustrated in FIG. 10: an example of a command for acting a motor that causes the active articulation included in the robot 200 to be driven) on the basis of the operation space position target value delivered from the converter 118 and data ("X" illustrated in FIG. 10) indicating an operation space position acquired from the robot 200.

The robot 200 moves by moving the active articulation on the basis of the control signal transmitted by the controller 120 of the processing unit 302.

The processing unit 302 has, for example, the configuration illustrated in FIG. 10.

Here, the adder 310 subtracts a value indicated by the detection result of the force sensor acquired from the robot 400 from the calculation result of the adder 116. In addition, the converter 118 according to the second embodiment converts the calculation result of the adder 310 into the operation space position target value and the controller 120 according to the second embodiment transmits the control signal to the robot 200 on the basis of the operation space position target value delivered from the converter 118.

Accordingly, the processing unit 302 can control a motion of the robot 200 (the first robot) on the basis of the detection result of the force sensor included in the robot 400 and acquired from the robot 400 (the second robot).

In addition, the processing unit 302 has basically the same function as the processing unit 102 included in the processing device 100 according to the first embodiment. Accordingly, in the processing device 300 including the processing unit 302, the same advantageous effects as the processing device 100 according to the first embodiment are obtained.

Note that a configuration of the processing unit 302 according to the second embodiment is not limited to the configuration illustrated in FIG. 10.

For example, in a way similar to the processing unit according to the first embodiment, the processing unit 302 may have a configuration in which the adder 112, the adder 116, the adder 310, the converter 118, and the controller 120 illustrated in FIG. 10 are not included. Even in the configuration in which the adder 112, the adder 116, the adder 310, the converter 118, and the controller 120 illustrated in FIG. 10 are not included, the processing unit 302 can estimate a holding force with which the operator holds the operation body in the robot 200 (an example of a robot including an operation body provided in a link connected to a passive articulation).

In addition, in a way similar to the processing unit according to the first embodiment, the processing unit 302 may have, for example, a configuration in which the converter 118 and the controller 120 illustrated in FIG. 10 are not included. Even in the configuration in which the converter 118 and the controller 120 illustrated in FIG. 10 are not included, the processing unit 302 can compensate the estimated holding force and estimate a pure operating force.

Note that in a case in which the processing unit 302 has the configuration in which the adder 112, the adder 116, the adder 310, the converter 118, and the controller 120 illustrated in FIG. 10 are not included or the configuration in which the converter 118 and the controller 120 illustrated in FIG. 10 are not included, a motion of the robot 200 may be controlled when the processing device 300 and an external device cooperate to perform a process.

In addition, in the configuration illustrated in FIG. 10, the process in the processing unit 302 is divided for convenience. Accordingly, the configuration of the processing unit 302 is not limited to the configuration illustrated in FIG. 10 (also including the configuration according to the foregoing modification example), but processes in some or all of the constituent elements illustrated in FIG. 10 may be performed by common hardware.

[IV] Advantageous Effects Obtained in System 2000 and Modification Examples of System 2000

The system 2000 according to the second embodiment includes the robot 200 (the first robot) that has the above-described function and configuration, the robot 400 (the second robot) that has the above-described function and configuration, and the processing device 300 that has the above-described function and configuration.

As described above, the processing device 300 included in the system 2000 has basically the same function as the processing device 100 according to the first embodiment. Accordingly, since the system 2000 includes the processing device 300, the same advantageous effects as the system 1000 according to the first embodiment are obtained.

In addition, the processing device 300 included in the system 2000 controls a motion of the robot 200 which is the master-side device on the basis of the detection result of the force sensor included in the robot 400 and acquired from the robot 400 which is the slave-side device. Accordingly, the system 2000 realizes the bilateral system capable of performing "the force feedback control in which the detection result of the force sensor included in the robot 200 (the master-side device) and the detection result of the force sensor included in the robot 400 (the slave-side device) are used", as illustrated in FIG. 9.

Note that a configuration of the system according to the second embodiment is not limited to the example illustrated in FIG. 7.

For example, the processing device 300 and the robot 200 illustrated in FIG. 7 may be the same device. As a case in which the processing device 300 and the robot 200 may be the same device, an example in which a robot including an operation body provided in a link connected to a passive articulation has the function and the configuration of the processing device 300 can be given.

[V] Application Example of System According to Second Embodiment

The processing device has been exemplified above as a constituent element of the system according to the second embodiment, but the present embodiment is not limited to the example. The present embodiment can be applied to various devices, for example, a computer such as a PC or a server, a communication device such as a smartphone, a tablet device, and a game device. In addition, the present embodiment can also be applied to, for example, an IC which can be embedded in the foregoing device. Further, as described above, the embodiment can also be applied to a robot including an operation body provided in a link connected to a passive articulation.

In addition, the first robot including the operation body provided in the link connected to the passive articulation has been described as a constituent element of the system according to the second embodiment, but the first robot according to the present embodiment is not limited to the example. The present embodiment can be applied to any device which includes a passive articulation and can be operated by an operator, for example, a haptic device including a passive articulation such as a type of haptic device in which three attitude axes are passive articulations.

In addition, the second robot that includes the force sensor as a constituent element of the system according to the second embodiment and moves on the basis of a motion of the first robot has been described above, but the second robot according to the present embodiment is not limited to the example. The present embodiment can be applied to, for example, any device which can function as a slave in the bilateral system.

Program According to Present Embodiment

A program causing a computer to function as the processing device according to the present embodiment (for example, a program causing "a function of the processing unit 102 (also including the configuration according to the modification example) according to the first embodiment" or "a function of the processing unit 302 (also including the configuration according to the modification example) according to the second embodiment" to be realized) is executed by a processor or the like in the computer and can estimate a holding force with which an operator holds an operation body in a robot including an operation body provided in a link connected to a passive articulation.

In addition, the program causing a computer to function as the processing device according to the present embodiment is executed by a processor or the like in the computer, and thus it is possible to obtain the advantageous effects in, for example, the processing device according to the above-described first embodiment (also including the configuration according to the modification) and the processing device according to the second embodiment (also including the configuration according to the modification example).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, in the above, the description is given of the case of providing the program (computer program) for causing the computer to function as the information processing device according to the present embodiment, but in the present embodiment, a recording medium having the program stored thereon can also be provided.

The above-described configuration shows an example of the present embodiment, and it naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A processing device including:
a processing unit configured to estimate a holding force with which an operator holds an operation body on the basis of a model that corresponds to a first robot including the operation body provided in a link connected to a passive articulation and a force sensor detecting a force applied to the operation body, the model regarding the force sensor part as a virtual articulation.

(2)
The processing device according to (1), in which the processing unit estimates the holding force on the basis of a virtual force necessary to hold the virtual articulation calculated on the basis of the model and a distance between a position at which the operator holds the operation body and the virtual articulation.

(3)
The processing device according to (1) or (2), in which the processing unit estimates an operating force of the operator with respect to the operation body on the basis of a detection result of the force sensor included in the first robot and the estimated holding force.

(4)
The processing device according to (3), in which the processing unit estimates the operating force by subtracting the estimated holding force from a force applied to the operation body based on the detection result of the force sensor included in the first robot.

(5)
The processing device according to (3) or (4), in which the processing unit controls a motion of the first robot on the basis of the estimated operating force.

(6)
The processing device according to (5), in which the processing unit further includes a force sensor and controls a motion of the first robot on the basis of a detection result of the force sensor included in a second robot, the detection result being acquired from the second robot moving on the basis of the motion of the first robot.

(7)
A system including:
a first robot including an operation body provided in a link connected to a passive articulation and a force sensor that detects a force applied to the operation body;
a second robot including a force sensor and configured to move on the basis of a motion of the first robot; and
a processing device configured to control the motion of the first robot,
in which the processing device includes a processing unit, and
the processing unit
estimates a holding force with which an operator holds an operation body on the basis of a model that corresponds to the first robot and regards the force sensor part as a virtual articulation,
estimates an operating force of the operator with respect to the operation body on the basis of a detection result of the force sensor included in the first robot and the estimated holding force, and
controls a motion of the first robot on the basis of the estimated operating force.

(8)
A control method performed by a processing device, the method including:
a step of estimating a holding force with which an operator holds the operation body on the basis of a model that corresponds to a robot including the operation body provided in a link connected to a passive articulation and a force sensor detecting a force applied to the operation body, the model regarding the force sensor part as a virtual articulation;
a step of estimating the operating force of the operator with respect to the operation body on the basis of a detection result of the force sensor included in the robot and the estimated holding force; and
a step of controlling a motion of the robot on the basis of the estimated operating force.

REFERENCE SIGNS LIST

10, 102, 302 processing unit
12, 110 inverse dynamics calculator
14, 112, 116, 310 adder
16, 118 converter
18, 120 controller
100, 300 processing device
114 holding force estimator
200, 400 robot
202, 402 sensor unit
204, 404 driving unit
1000, 2000 system

The invention claimed is:
1. A processing device, comprising:
a memory configured to store model information that indicates a model corresponding to a first robot, wherein the first robot includes:
a passive articulation,
an operation body in a link connected to the passive articulation, and
a first force sensor that detects a force applied to the operation body, and
the model regards the first force sensor as a virtual articulation; and
a processing unit configured to estimate, based on the model indicated by the model information, a holding force with which an operator holds the operation body.

2. The processing device according to claim 1, wherein the processing unit is further configured to:
calculate a virtual force necessary to hold the virtual articulation,
wherein the calculation of the virtual force is based on the model and a distance between a position at which the operator holds the operation body and the virtual articulation; and
estimate the holding force based on the calculated virtual force.

3. The processing device according to claim 1, wherein the processing unit is further configured to estimate an operating force of the operator with respect to the operation body, based on a detection result of the first force sensor included in the first robot and the estimated holding force.

4. The processing device according to claim 3, wherein the processing unit is further configured to estimate the operating force by subtraction of the estimated holding force from the force applied to the operation body.

5. The processing device according to claim 3, wherein the processing unit is further configured to control a motion of the first robot based on the estimated operating force.

6. The processing device according to claim 5, wherein the processing unit is further configured to:
acquire, from a second robot, a detection result of a second force sensor included in the second robot; and
control the motion of the first robot based on the detection result of the second force sensor included in the second robot,
wherein a movement of the second robot is based on the motion of the first robot.

7. A system, comprising:
a first robot that includes:
a passive articulation,
an operation body in a link connected to the passive articulation, and
a first force sensor configured to detect a force applied to the operation body;
a second robot including a second force sensor,
wherein the second robot is configured to move based on a motion of the first robot; and
a processing device configured to control the motion of the first robot,
wherein the processing device includes:
a memory configured to store model information that indicates a model corresponding to the first robot,
wherein the model regards the first force sensor as a virtual articulation, and
a processing unit configured to:
estimate, based on the model indicated by the model information, a holding force with which an operator holds the operation body,
estimate an operating force of the operator with respect to the operation body, based on a detection result of the first force sensor included in the first robot and the estimated holding force, and
control the motion of the first robot based on the estimated operating force.

8. A control method, comprising:
in a processing device that includes a memory:
storing, in the memory, model information that indicates a model corresponding to a robot, wherein
the robot includes:
a passive articulation,
an operation body in a link connected to the passive articulation, and
a force sensor that detects a force applied to the operation body, and
the model regards the force sensor as a virtual articulation;
estimating, based on the model indicated by the model information, a holding force with which an operator holds the operation body;
estimating an operating force of the operator with respect to the operation body, based on a detection result of the force sensor included in the robot and the estimated holding force; and
controlling a motion of the robot based on the estimated operating force.

* * * * *